Figure 1:
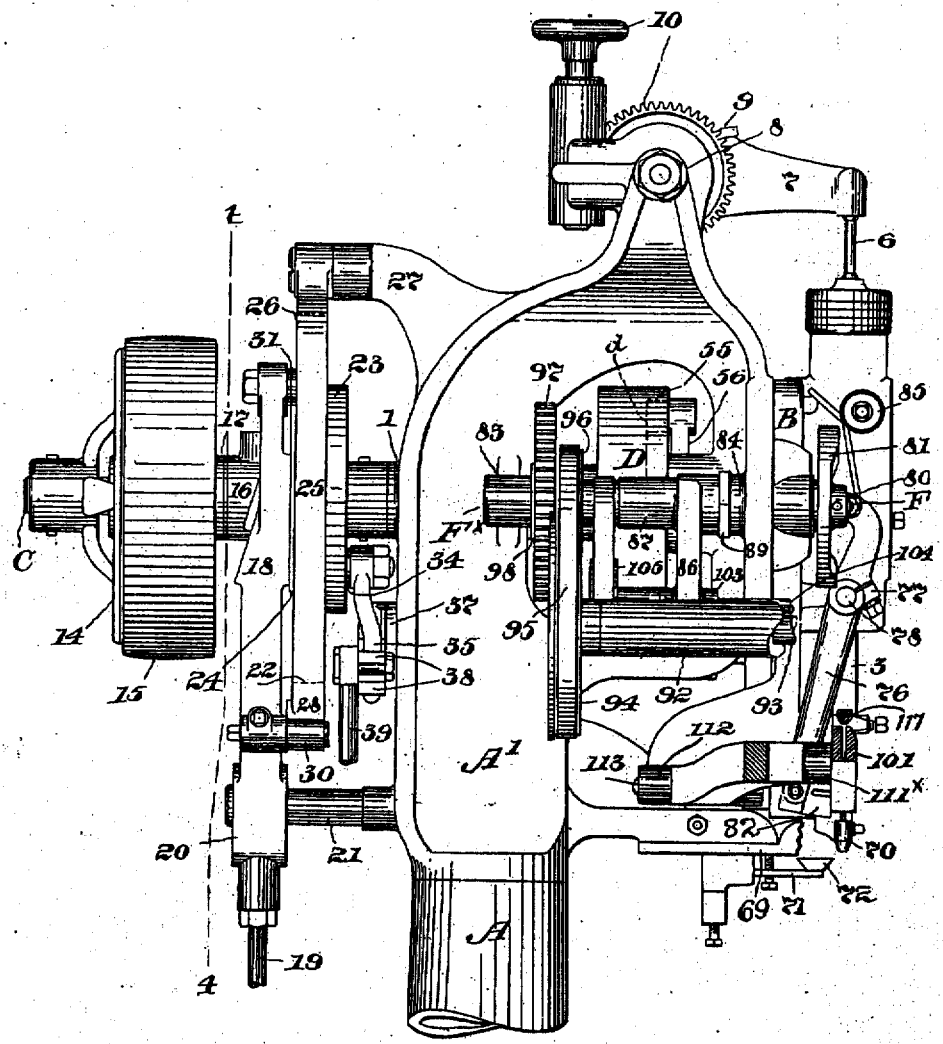

H. H. CUMMINGS.
LOOSE NAILER.
APPLICATION FILED DEC. 23, 1905.

996,065.

Patented June 27, 1911.
3 SHEETS—SHEET 1.

Witnesses:
Horace H. Crosman
Robert H. Kammler

Inventor:
Henry H. Cummings
by Emery, Booth & Powell,
Attys.

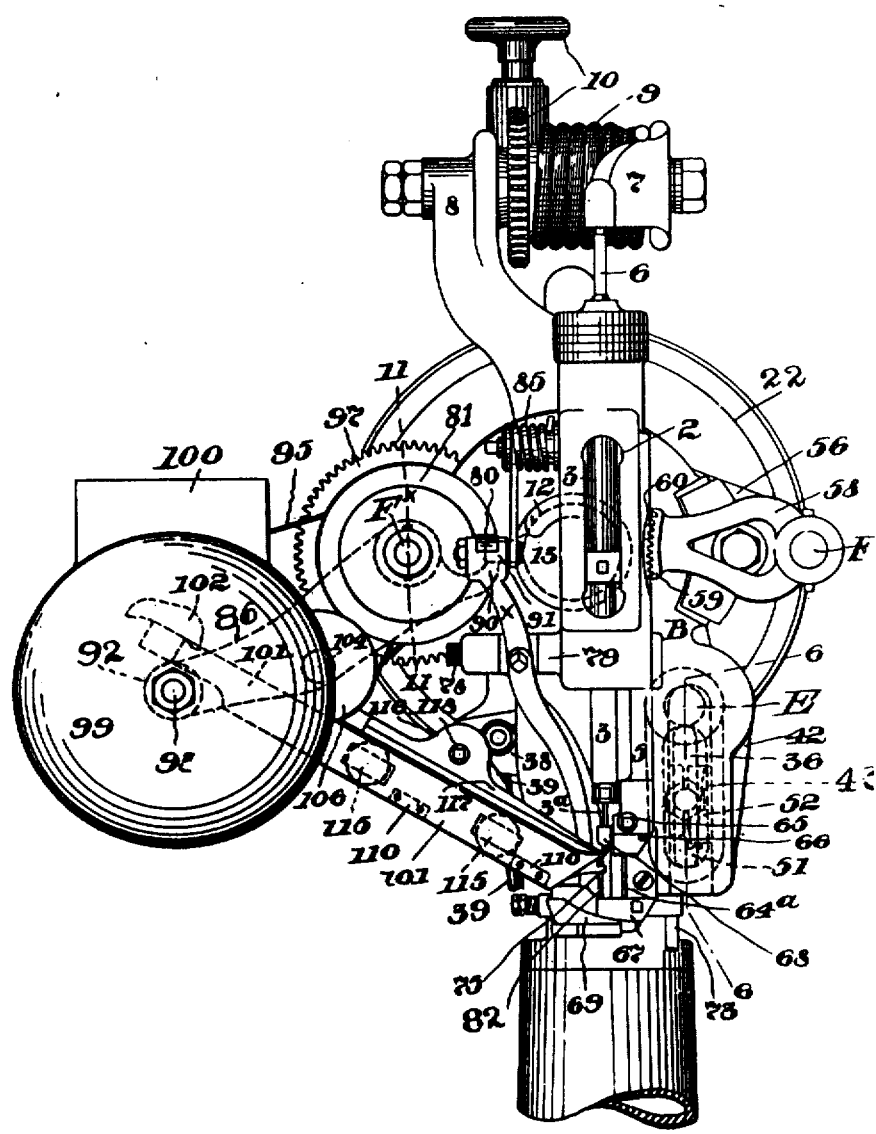

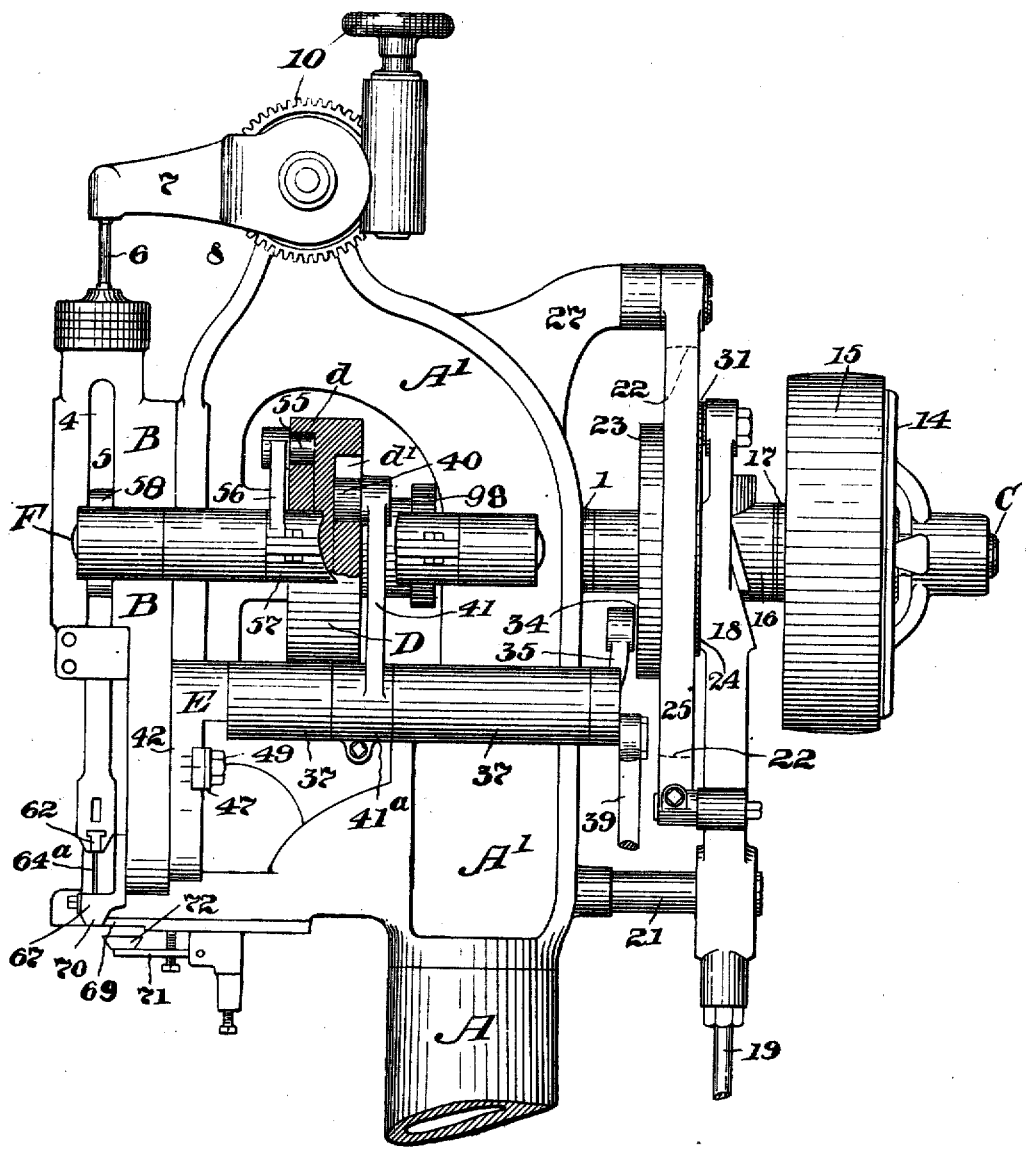

H. H. CUMMINGS.
LOOSE NAILER.
APPLICATION FILED DEC. 23, 1905.
996,065.
Patented June 27, 1911.
6 SHEETS—SHEET 4.
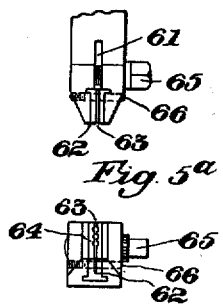
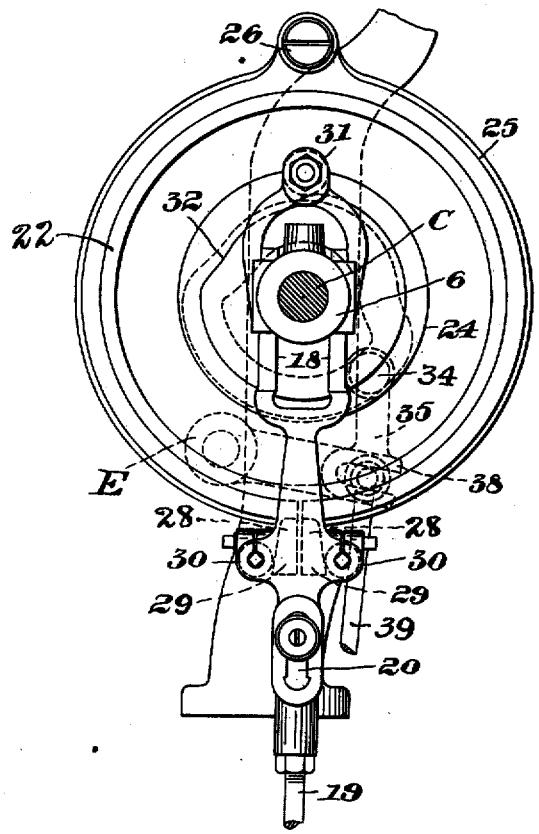
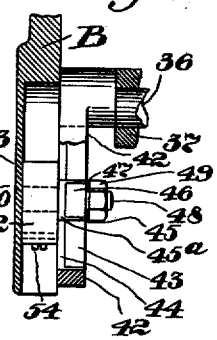
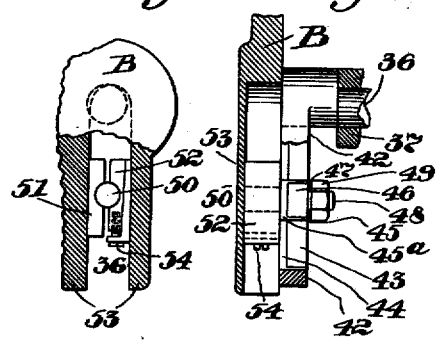
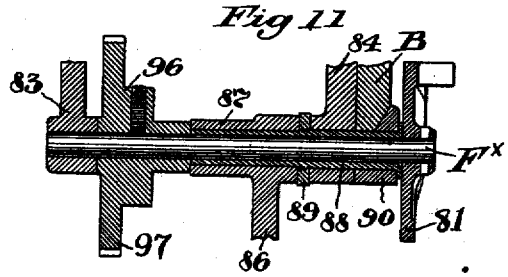
Witnesses:
Horace N. Crisman.
Robert H. Kammler.
Inventor:
Henry H. Cummings,
by Emery, Booth, & Powell,
Attys.

H. H. CUMMINGS.
LOOSE NAILER.
APPLICATION FILED DEC. 23, 1905.
996,065.
Patented June 27, 1911.
6 SHEETS—SHEET 5.
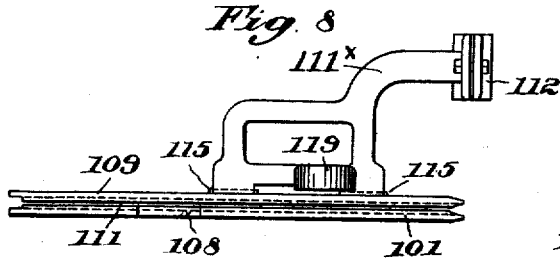
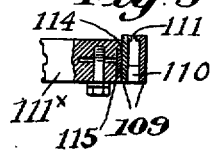
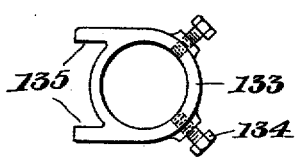
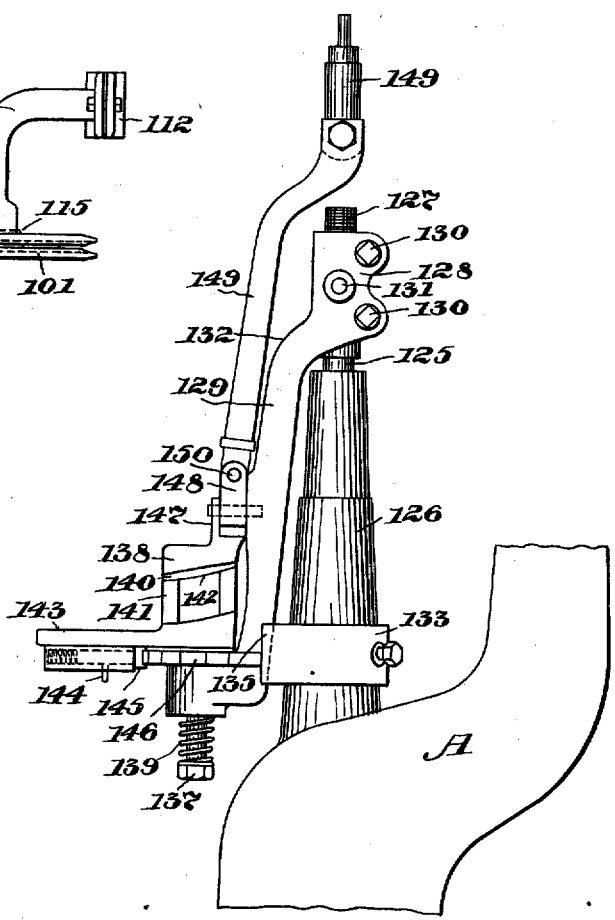
Witnesses:
Horace H. Crosman
Robert H. Kammler.
Inventor:
Henry H. Cummings.
by Emery, Booth, & Powell,
Attys.

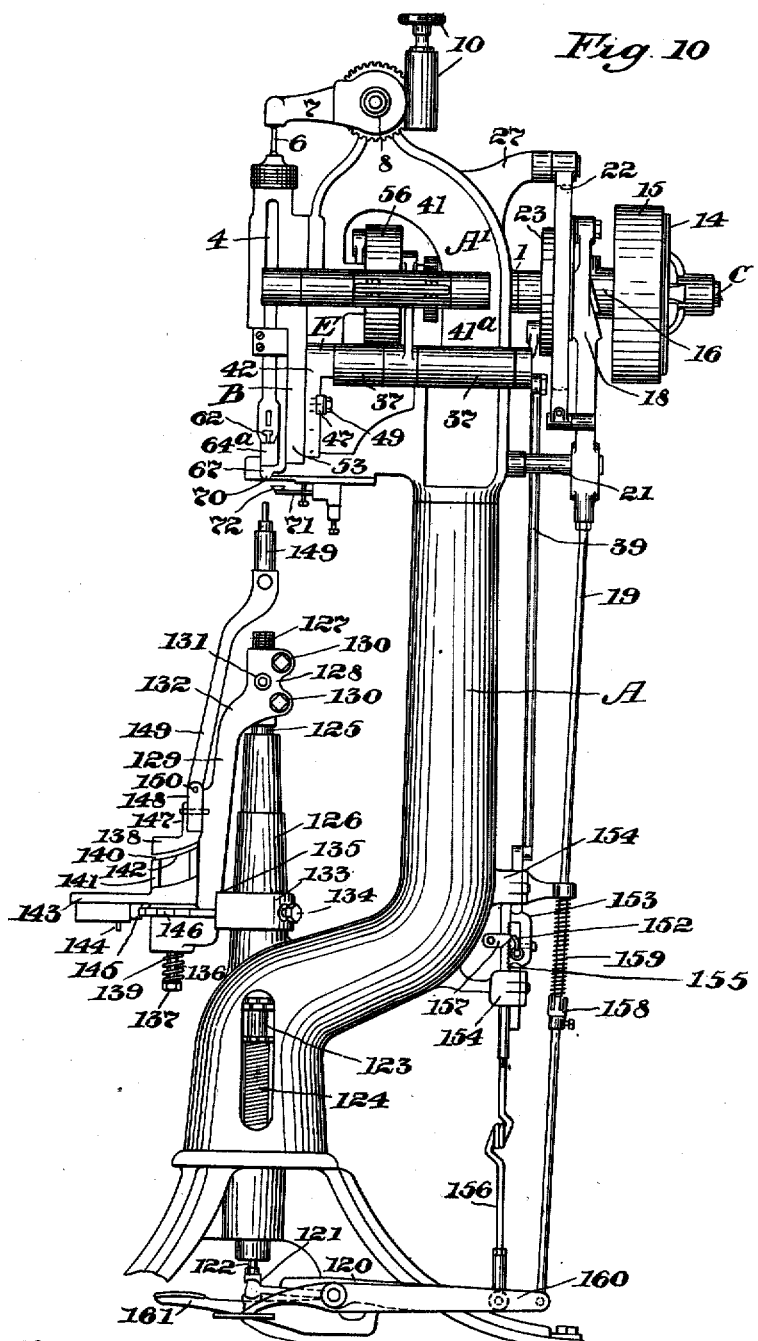

UNITED STATES PATENT OFFICE.

HENRY H. CUMMINGS, OF NEWTON, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

LOOSE NAILER.

996,065.          Specification of Letters Patent.     Patented June 27, 1911.

Application filed December 23, 1905. Serial No. 293,047.

*To all whom it may concern:*

Be it known that I, HENRY H. CUMMINGS, a citizen of the United States, residing at Newton, in the county of Middlesex, Commonwealth of Massachusetts, have invented an Improvement in Loose Nailers, of which the following description, in connection with the accompanying drawings, is a specification, like letters on the drawings representing like parts.

My invention relates to machines for nailing boots and shoes and particularly to that type of machine known to the trade as "loose nailers". In these machines, loose nails placed in a hopper are automatically delivered to a roadway, down which they are compelled to travel to be separately placed in the path of a reciprocating driver and driven thereby into the work resting upon a suitable support.

The features of my invention will be best understood and appreciated by reference to the following description when taken in connection with the accompanying drawings, of a machine illustrating one embodiment of my invention, while its scope will be more particularly pointed out in the appended claims.

Referring to the drawings,—Figure 1 is an elevation of the left side of the upper part of a nailing machine; Fig. 2, a front elevation thereof; Fig. 3, an elevation of the right side of the nailing mechanism; Fig. 4, a transverse vertical sectional detail on line 4—4, Fig. 1, to show the clutch and brake mechanism; Fig. 5, a detail showing in side elevation the lower end of the awl driver and the awl carrier mounted therein with its vertical grooves for variably positioning the awl therein; Fig. 5ª, a plan view of the awl bar and carrier from below; Fig. 6, a vertical sectional detail taken on line 6—6, Fig. 2; Fig. 7, a partial sectional elevation thereof; Figs. 8 and 9, details of the carrier and raceway connections; Fig. 10, an elevation of the complete machine from the right side; Fig. 11, a vertical section on line 11—11, Fig. 2; Fig. 12, an elevation of the base of the standard to show the horn and its supporting mechanism, looking from the right; and, Fig. 13, a detail to show the yoke and collar to engage the hanger arm of the horn shaft.

In the embodiment of the invention herein selected for illustration, my nailing machine,—see Figs. 1, 2 and 10,—is provided with the usual column, A, supporting the frame or head, A′, having bearings, 1, for a horizontal drive shaft, C, and for a rocking-head, B, adapted to be oscillated by rotation of the drive shaft, C. This oscillatory head, B, has a vertical passage, 2, for a driver bar, 3, carrying the driver, 3ª, and is provided with a longitudinal groove, 4 (Figs. 3 and 10), to receive the awl bar, 5. A strut, 6 (Figs. 1 to 3), is ball jointed to the upper end of the driver bar and to a lever, 7, pivoted on a bracket, 8, at the top of the frame, A′. A coil spring, 9, encircling the bracket pivot, is interposed between the arm of the lever and the frame to drive the bar down and is provided with adjusting means, 10, to regulate its tension, as in Patents Nos. 365,227 and 490,624, and being well understood by those skilled in the art needs no further description or illustration. To lift the driver bar against the action of the spring, I provide a projecting lug, 12, on a cam, 13, mounted upon the front end of the drive shaft, which lifts the driver bar at each rotation of the shaft, permitting it to drop from the projection and, under the action of its spring, drive the fastening.

The rear end of the drive shaft,—see Figs. 1, 3, 4, and 10,—has a suitable, fast pulley, 14, mounted within a recess of a loose pulley, 15, constituting one form of friction clutch. A loose collar, 16, is mounted on the drive shaft in front of the loose pulley, to bear against the pulley hub, 17, and is recessed to receive the sides of a wedge, 18, slotted to embrace said collar and shaft. The lower end of the wedge or actuator is adjustably secured to the upper end of a treadle rod, 19, and is provided with a longitudinal guide slot, 20 (Fig. 4) for a guide pin, 21, secured to the frame A′. The lower end of this rod (Fig. 10), is provided with a usual collar, 158, and spring, 159, and is connected to the operating treadle, 160. The treadle rod is elevated in the usual manner against the tension of its spring, by depression of said treadle, 160, to elevate the rod and its wedge and slide the loose collar and pulley into engagement with the fast pulley to roteeth of the wheel acting against the heads of any nails which are not properly seated, or those sliding down the slot endwise. The raceway is guided and supported by a carrier, 111ˣ (see Figs. 1, 8 and 9), having split sleeve bearings, 112, at its inner end, clamped to a stub shaft, 113, Fig. 1 which is mounted in bearings upon the oscillatory head, B. The outer end of the carrier is provided with dove-tailed grooves, 114 (Fig. 9), engaging similarly shaped blocks or ribs 115 on the back of the rear plate, 109, of the raceway, and an ear, 116, (Fig. 2) is formed upon the roadway covering plate, 117, drilled to receive a bolt, 118, by which it is secured to a similar ear, 119, formed upon the carrier. The carrier being thus firmly secured to the oscillatory head, the roadway or raceway is forced to reciprocate in the hopper, said motion also assisting the slide of the nails down the raceway, and preventing lateral displacement between the nail receiving block and the raceway fitted thereto by the described tongue and groove connection.

Referring now to Figs. 10 and 12: the horn actuating rod, 39, is joined to the horn depressing lever or treadle 120, which is pivotally connected at 121, with the lower end of the horn shaft, 122. Said horn shaft is provided within the base of the column, with a usual adjustable collar, 123, and coil spring, 124, the normal tendency of which is to lift the horn shaft, 125, and maintain it in its upper or elevated position. This column is provided with a tapering standard, 126, drilled to guide the upper end of said horn shaft, which is threaded at its upper end, 127, to receive thereon a split hub, 128, formed upon the upper end of a hanger arm, 129. This hanger arm is firmly secured on the horn shaft by a pair of clamping bolts, 130, and a through and through bolt, 131, and the lower portion of said hanger is curved at 132, so as to offset it from the horn shaft. The base of the standard is provided with a collar or sleeve, 133 (Fig. 13), clamped thereon by the bolts, 134, and the outer walls of the collar are formed to present a yoke, 135, to receive the lower end of the hanger and lock it positively in position. The lower end of the hanger arm is shaped to form a bearing for a short shaft, 136, having a headed nut, 137, on its lower end, the said shaft being tapped into or projecting from an enlarged cam head, 138, on the upper end of said shaft, a coil spring, 139, being interposed between the head and hanger bearing to normally force the shaft to its lowest position. This cam head is provided with a spiral recess, 140, or cam face bearing against a collar, 141, having a similar spiral, 142, or inclined upper edge and constituting a vertical cam. Said vertical cam, 141, has a projecting handle or actuator, 143, with a slidable finger, 144, on its under side, depending from a spring controlled ratchet pin, 145, normally engaging a ratchet, 146, formed at the base of the hanger. By moving the pin outward and swinging the actuator to the right or left, the enlarged head may be lowered or raised to depress or elevate the horn, as desired. An ear or lug, 147, is formed at the top of said enlarged head, a link, 148, being pivotally connected therewith, which, at its upper end is pivotally connected to the lower end of the outwardly curved horn, 149, by suitable means, as the pin, 150. By this arrangement, the horn may be swung laterally to the right or left, and toward and from the machine to enable work supported thereon to be placed in any position desired. The horn is pulled down positively and to a uniform distance below the under side of the stock after driving each fastening, and while the awl is feeding the stock, by means of a pawl, 152, pivoted on the pawl carrier, 153, which is slidable in guides, 154, and connected to the horn actuating rod, 39. This carrier, 153, is lifted once at each revolution of the drive shaft by the cam, 23, through the lever, 35, said lifting occurring immediately after the driver has descended and the awl is in the stock, while being moved by the oscillatory head, B, to feed the stock. The pawl, 152, as it is elevated, engages the rack, 155, also mounted in the guides, 154, and the rack being connected with the lever, 120, by a rod, 156, said lever is moved thereby or oscillated to depress its outer end and the horn shaft and horn connected therewith. As the horn actuating rod is depressed by the cam, 23, the cam block, 157, moves the pawl outwardly to disengage it from the rack, the coil spring, 124, immediately acting to elevate the horn against the stock whatever may be its thickness. By this arrangement the horn is always depressed a uniform or fixed distance from the under side of the stock, notwithstanding variations in its thickness. For depressing the horn at will, an emergency foot treadle, 161, is provided, which, however, being an old and usual form of treadle, needs no further description.

In the operation of the machine, the lasted shoe is mounted upon the horn and the heel of the upper is brought in position against the roller of the edge-gage and adjacent that portion of the heel seat where nailing is to be begun. The machine is started by giving the treadle, 160, a downward impulse just sufficient to elevate its treadle rod and wedge to actuate the clutch and release the brake, causing the rotation of the drive shaft and its cams. The rotation of these cams controls and operates the horn, the driver and separator, and moves the rock-shafts to oscillate the driver and awl carrying head, B, and the raceway connected thereto, while feeding the stock along at the proper time on the release of the work by the timed depression of the horn immediately after each nail has been driven. The feeding of the stock is effected by the awl, which has been driven into the stock by the movement of the segmental arm as it is oscillated by its rock shaft. While the nailing and awl driving operations are going on, the gear wheels have caused the rotation of the shelved drum and clearers to effect a proper supply and feeding of the loose nails to the shelf and raceway. Immediately after the work has been fed and the awl removed from the work so that the awl hole is directly below the nose, the cam has rotated to present the portion of less diameter to the wedge roller, which is forced downward, releasing the clutch, applying the brake, and stopping the machine with its horn depressed and the driver and awl bars elevated.

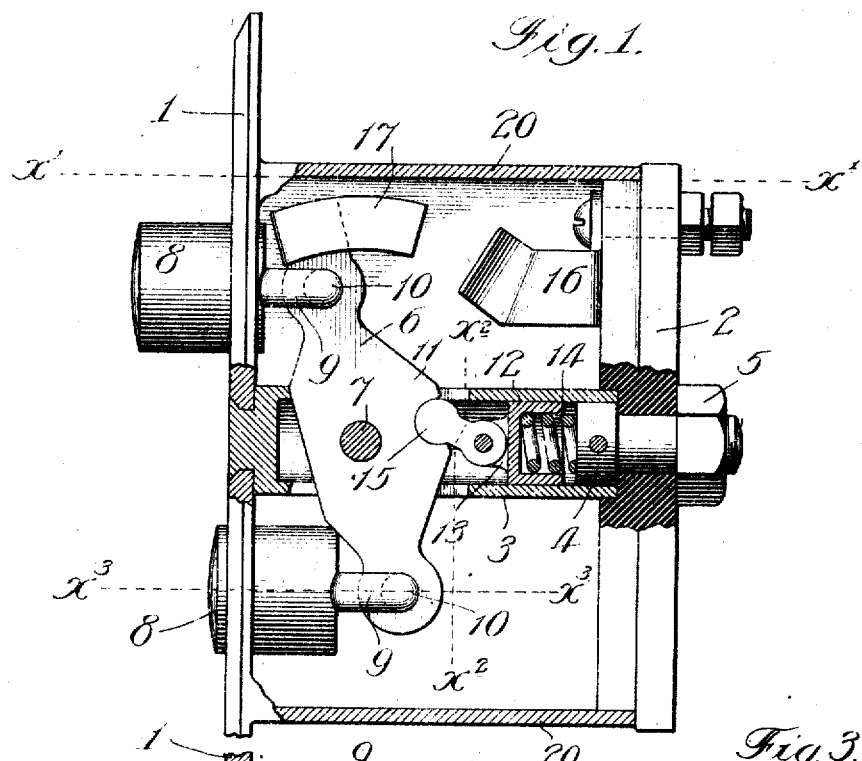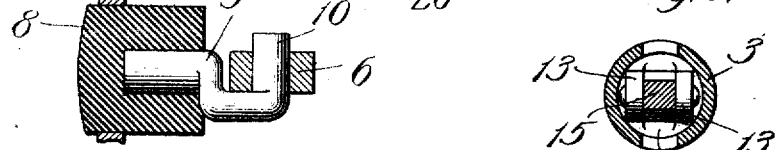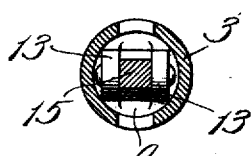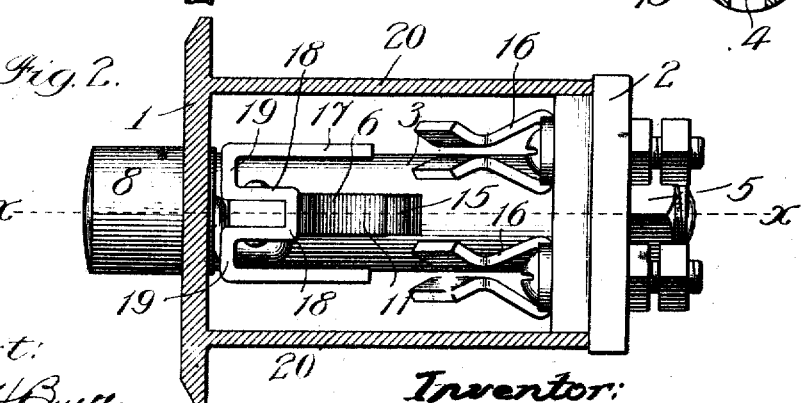

I claim—

1. In a nailing machine, the combination of a nail driver and awl, a drive shaft, a raceway for delivering nails, means for supplying nails to the raceway, a nail separator for presenting nails singly from the raceway to the driver, a separator shaft, gearing connected to the drive shaft and separator shaft to actuate the latter at reduced speed, and means actuated by the single separator shaft to operate the nail supplying means, and devices operated from the separator shaft to cause the separator to make a plural number of separating excursions across the raceway to each single revolution of the separator shaft.

2. In a nailing machine, a drive shaft and means for rotating it, a driver, an awl bar having a grooved slot in the end thereof, a removable awl carrier connected therewith, provided with means for clamping an awl therein, and means for reciprocating the driver and awl by rotation of the driveshaft.

3. In a nailing machine, a driver, an awl bar having a groove in its lower end, an awl carrier therein, means for holding an awl in said carrier in one of a series of positions laterally stepped from said driver, means for securing the carrier to the grooved awl bar, and means for reciprocating the driver and the awl bar.

4. In a nailing machine, the combination of a nail driver and awl, a drive shaft, means for supplying nails to be driven, a nail separator lever carrying a nail separator for presenting nails singly from the supplying means to the driver, a separator shaft having a cam provided with two diametrically disposed risers for acting on the separator lever to cause the nail separator to make two nail separating excursions to each single rotation of the separator shaft, and connections between the same separator shaft and nail supplying means to operate the latter.

5. In a nailing machine, a drive shaft and means for operating it, a driver, an awl bar, an awl carrier removably connected to said awl bar and having a series of positioning grooves for an awl disposed laterally at varying distances from the driver, and means for reciprocating the driver and awl.

6. In a nailing machine of the character described, a drive shaft, means for operating it, an awl bar having an awl carrier connected thereto and provided with a series of positioning means for an awl disposed laterally at varying distances from the driver, a nail receiving block having a series of guiding means for the awl corresponding to the awl positioning means and means for reciprocating the driver and awl bar.

7. In a nailing machine of the character described, the combination of a drive shaft, a driver, an awl bar 5 having a slot extending transversely thereof, a slotted carrier clamped therein and having a series of grooves 64 for positioning an awl with respect to the driver, the oscillating head B carrying a block having a series of holes corresponding to the awl positioning grooves, and means for reciprocating the awl bar and driver.

8. In a nailing machine of the character described the combination with the drive shaft and means for operating it, a driver, an awl bar, an awl carrier having position determining grooves for an awl therein, an oscillating head B, and means for oscillating the head and means for adjusting the head oscillating means to correspond to the position determining grooves in the awl carrier.

9. In a nailing machine, the combination of a nail driver and awl, a drive shaft, a raceway for delivering nails, rotary means for delivering nails to said raceway, a nail separator for presenting nails singly from the raceway to the driver, a separator shaft, gearing connection between the separator shaft and drive shaft to operate the separator shaft at reduced speed, operating connections between the slowly rotating separator shaft and rotary nail delivery means to slowly rotate the latter, and means actuated by the slowly rotating separator shaft to cause two nail separating excursions of the separator across the raceway to each single revolution of the separator shaft.

10. In a nailing machine, the combination of a drive shaft, a separator shaft driven therefrom at reduced speed, a rotary hopper sustained by the separator shaft, a nail separator, and connections between the nail separator and separator shaft, and between the hopper and separator shaft, for causing the nail separator to make a nail separating excursion and supply a nail to the driver for each driving stroke and for causing the rotary hopper to be slowly rotated to supply nails to the separator.

In testimony whereof, I have signed my name to this specification, in the presence of two subscribing witnesses.

HENRY H. CUMMINGS.

Witnesses:
IRVING C. DECATUR,
SIDNEY F. SMITH.

Copies of this patent may be obtained for five cents each, by addressing the "Commissioner of Patents, Washington, D. C."